(12) United States Patent
Hunter, Sr.

(10) Patent No.: US 9,145,281 B1
(45) Date of Patent: Sep. 29, 2015

(54) LOGGING SYSTEMS AND METHOD

(71) Applicant: Shubert J. Hunter, Sr., Marble Mount, WA (US)

(72) Inventor: Shubert J. Hunter, Sr., Marble Mount, WA (US)

(*) Notice: Subject to any disclaimer, the term of this patent is extended or adjusted under 35 U.S.C. 154(b) by 97 days.

(21) Appl. No.: 13/753,337

(22) Filed: Jan. 29, 2013

(51) Int. Cl.
*B66C 21/08* (2006.01)
*B66C 21/00* (2006.01)
*B61B 7/02* (2006.01)

(52) U.S. Cl.
CPC .......... *B66C 21/08* (2013.01); *B66C 21/00* (2013.01); *B61B 7/02* (2013.01); *B66C 2700/011* (2013.01)

(58) Field of Classification Search
CPC ........ B66C 21/02; B66C 21/00; B66C 21/08; B66C 21/04; B66C 21/06; B61B 7/00; B61B 7/02; B61B 7/04; B61B 7/045; B61B 7/06; B61D 15/105; B61D 15/125
USPC .......... 212/313, 71, 76, 85, 94; 104/87, 89, 104/112–114, 93, 106, 110
See application file for complete search history.

(56) References Cited

U.S. PATENT DOCUMENTS

| | | | | |
|---|---|---|---|---|
| 523,216 A | * | 7/1894 | Lamb | 212/111 |
| 597,296 A | * | 1/1898 | Richson | 212/121 |
| 3,247,933 A | * | 4/1966 | Hanna | 188/137 |
| 3,407,942 A | * | 10/1968 | McIntyre et al. | 212/84 |
| 3,500,764 A | * | 3/1970 | Warman | 104/114 |
| 4,355,727 A | * | 10/1982 | Biller | 212/121 |
| 4,398,640 A | | 8/1983 | Hunter | |
| 4,440,305 A | * | 4/1984 | Biller et al. | 212/90 |

FOREIGN PATENT DOCUMENTS

CH 525835 A * 7/1972 .............. B66C 21/00

OTHER PUBLICATIONS

English translation of CH 525,835 A.*

* cited by examiner

*Primary Examiner* — Sang Kim
*Assistant Examiner* — Nathaniel Adams
(74) *Attorney, Agent, or Firm* — Dwayne E. Rogge; Schacht Law Office, Inc.

(57) ABSTRACT

A skyline transfer apparatus is disclosed herein having in one embodiment a carriage. The carriage in one form comprising: at least one carriage side-plate; a plurality of skyline riding sheaves rotatably attached at near and outbound end of the carriage side-plate(s). The skyline riding sheaves ride upon a tensioned skyline during operation of the carriage. A mainline attachment point is provided at the outbound end of the carriage side-plate(s). A haul-back line attachment point is provided at the near end of the carriage side-plate(s); and a drop line extends below the carriage to support a load. A jack is also disclosed, pivotably attached to an intermediate spar. The intermediate spar supports the jack above a ground surface between a main yarder and a strongpoint. The jack comprises at least one side-plate(s) with at least one skyline supporting sheave rotatably attached to the side-plate(s).

7 Claims, 4 Drawing Sheets

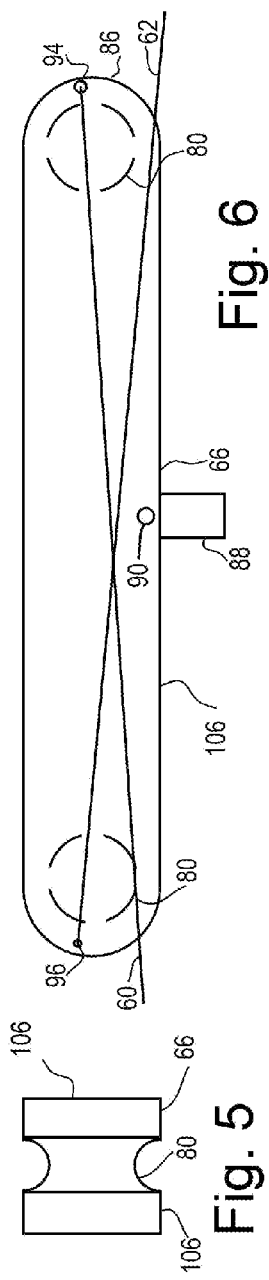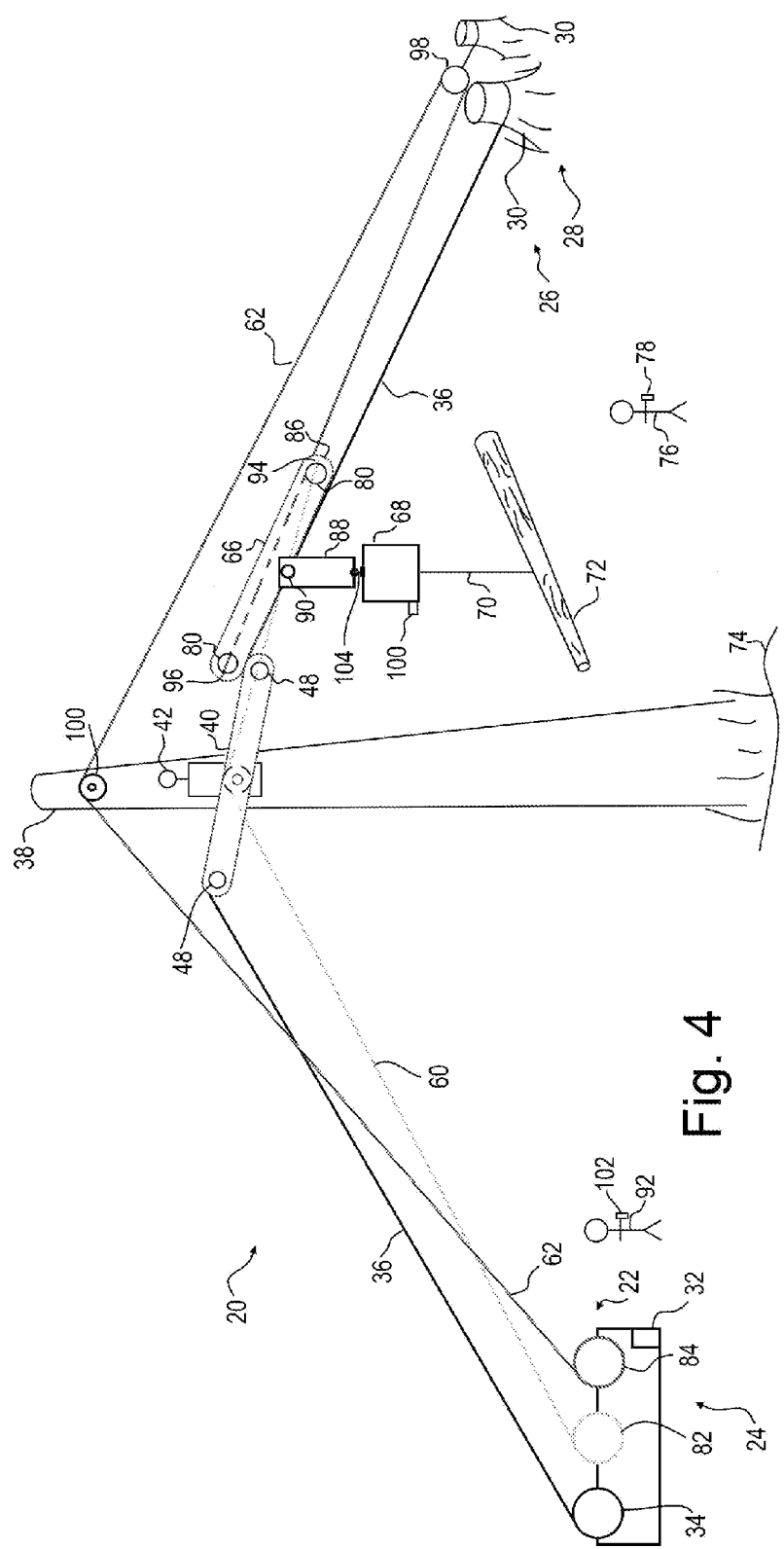

LOGGING SYSTEMS AND METHOD

BACKGROUND OF THE DISCLOSURE

Field of the Disclosure

This disclosure relates to the field of logging and other skyline load transfer operations.

SUMMARY OF THE DISCLOSURE

A skyline transfer apparatus is disclosed herein having a carriage comprising: at least one carriage side-plate comprising a near end and an outbound end relative to a main yarder; a plurality of skyline riding sheaves rotatably attached at the near and outbound end of the carriage side-plate(s); wherein the skyline riding sheaves ride upon a tensioned skyline during operation of the carriage; a mainline attachment point at the outbound end of the carriage side-plate(s); a haul-back line attachment point at the near end of the carriage side-plate(s); and a drop line extending below the carriage to support a load.

The carriage as recited above may further comprise an extension arm attached to the carriage side plate(s) and having the drop line attached thereto.

The carriage as recited above may be arranged wherein the drop line has a drop length from the carriage to the load, and wherein the drop length can be remotely adjusted by an operator.

The skyline transfer apparatus as recited above may further comprise: a jack pivotably attached to an intermediate spar; wherein the intermediate spar supports the jack above a ground surface; and wherein the jack comprises at least one side-plate(s) with at least one skyline supporting sheave rotatably attached to the side-plate(s).

The skyline transfer apparatus as recited above may be arranged wherein: the jack comprises a plurality of jack side-plates; the jack side-plates are pivotably coupled to a hanger attached to the intermediate spar; and the skyline supporting sheaves are rotatably attached at opposing ends of the jack side-plates with the hanger attached to the side plates therebetween.

The skyline transfer apparatus as recited above may further comprise a haulback/mainline sheave rotatably mounted to the jack to support the haulback and/or mainline.

BRIEF DESCRIPTION OF THE DRAWINGS

FIG. 4 is a side environmental view of a slightly different variation of the device.

FIG. 5 is and end view of one example of a carriage.

FIG. 6 is a side view of one example of a carriage.

DESCRIPTION OF THE PREFERRED EMBODIMENTS

Disclosed herein are modifications and improvements to a multi-span skyline carriage system. Multi-span herein referring to an apparatus having a first or near end, a second or outbound end, and at least one intermediate spar there between.

Single-span skyline logging operations suffer from different concerns, as it is relatively easy to move a load across a single span as related to movement across intermediate spars.

While skyline logging and cargo handling systems have been known in the art, the transfer of such cargo past intermediate spars in a skyline system has been problematic at best. One significant problem is found in skyline cable sag as the load carriage approaches intermediate spars. In this position, the angle of the skyline cable becomes more vertical dependent on the flexibility and tension of the cable, and the weight of the carriage and load. This often results in a bouncing effect which can be significantly detrimental to operations. In some severe instances, such bouncing can damage the apparatus and may result in the load coming off the skyline, or the skyline coming off the jack.

The apparatus and system disclosed herein is especially suited to multi-span skyline load handling operations to reduce the bouncing effect as the carriage traverses the jack.

Figure 1:
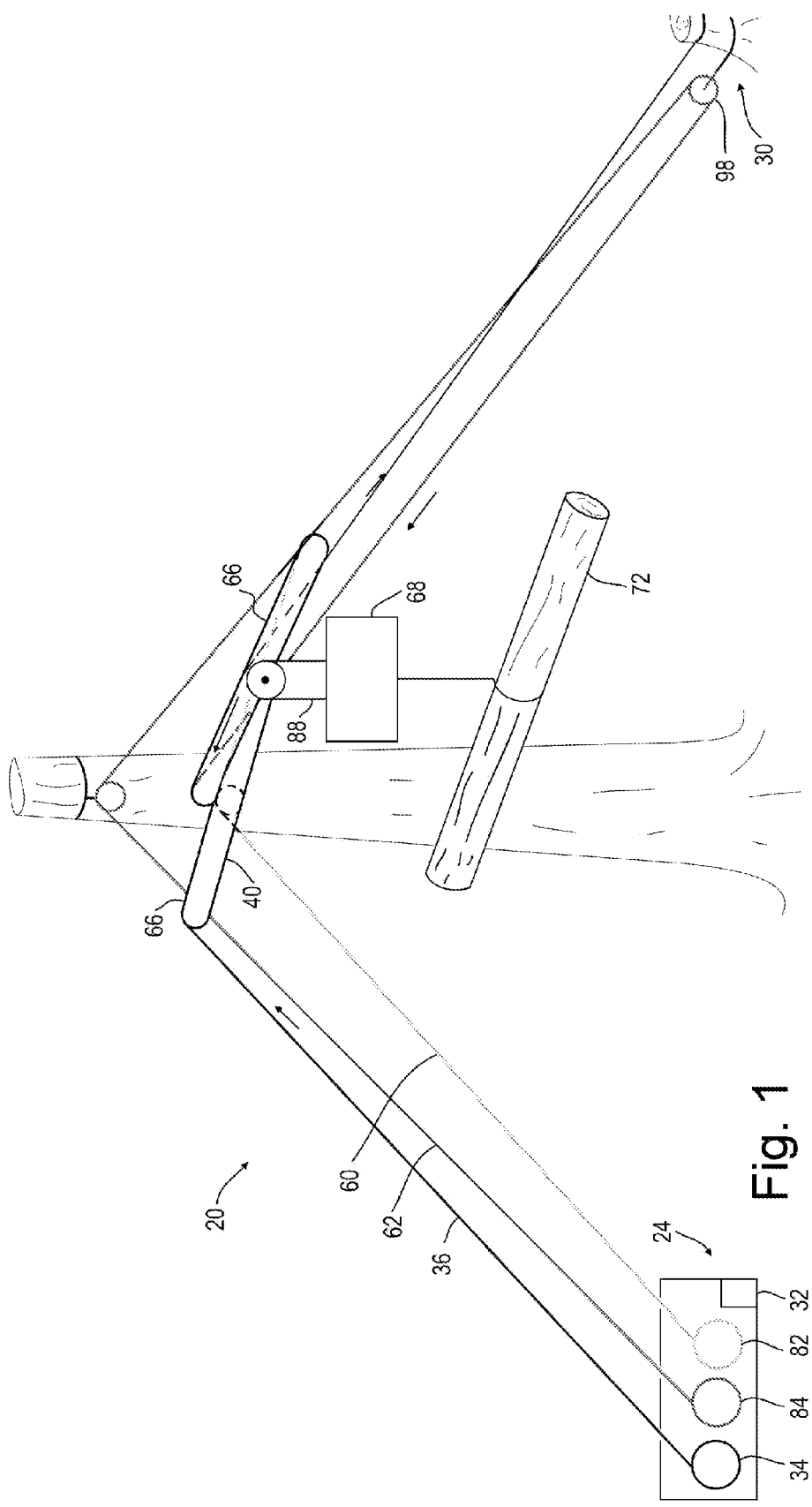
FIG. 1 is a side environmental view of one variation of the disclosed apparatus in several positions.

Looking to FIG. 4 is shown an improved skyline carriage system 20. The skyline carriage system utilizes a skyline cable 36 in one form with a first end 22 attached at a main yarder 24 and a second end 26 attached at a strongpoint 28. The strongpoint 28 is shown here as a plurality of stumps 30. In the example of FIG. 1 a single stump is utilized, although other anchor points could also be used. The term "stumps" being a colloquial term for the remainder of a tree, where the upper portion of the tree has been cut off and removed.

The yarder 24 in this example comprises a motor 32 and a plurality of powered and generally reversible winch drums 34, 82, and 84. A skyline drum 34 is utilized for tensioning of the skyline 36. As previously mentioned, in one form the skyline 36 extends from the first drum 34, past an intermediate spar 38 to one of the strong points 28. In this example, the skyline terminates at the strongpoint 28. The drum 34 providing sufficient tension to the skyline 36 to keep the carriage and load well above ground, including any foliage or other obstructions as well as to limit a significant portion of the "bouncing" effect as the carriage passes intermediate supporting spars 38.

The term "yarder" in logging and skyline load transfer operations generally meaning "a winch (or system of winches) powered by an engine and used to haul logs and other loads from a remote location to a landing or to a skid road.

Figure 2:
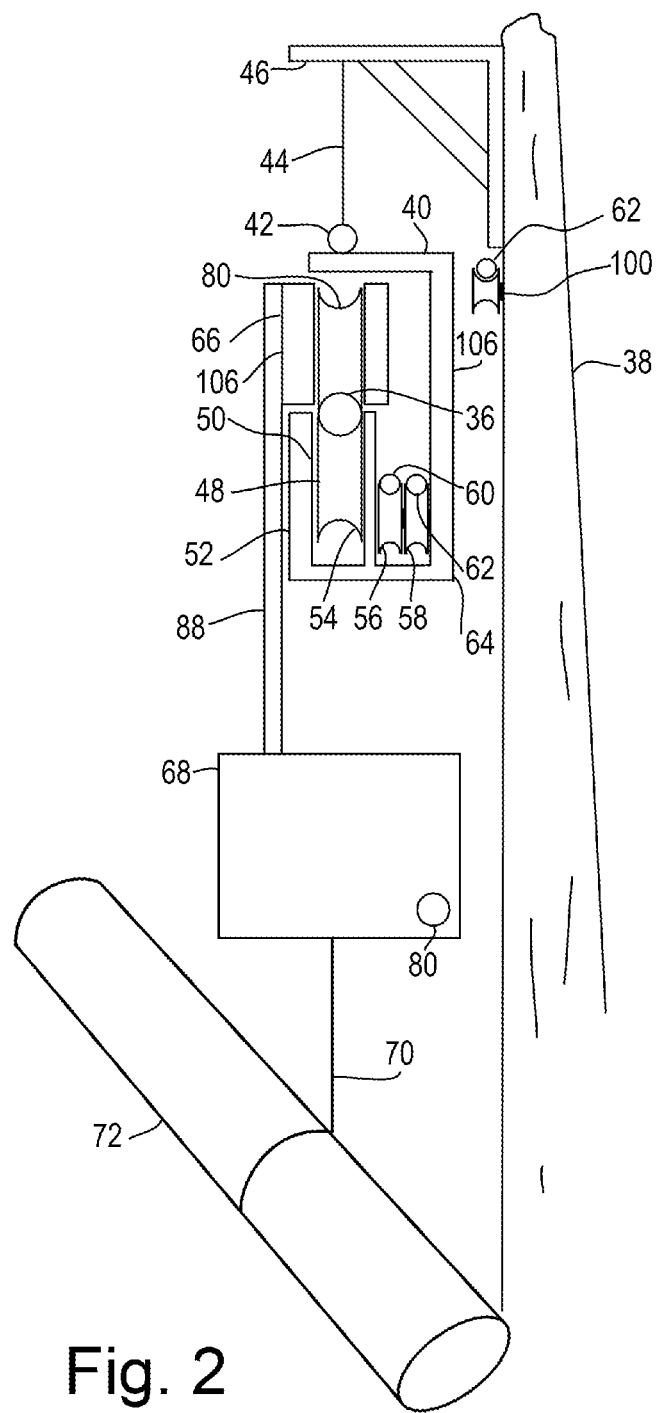
FIG. 2 is an end view of one variation of the disclosed apparatus.
Figure 3:
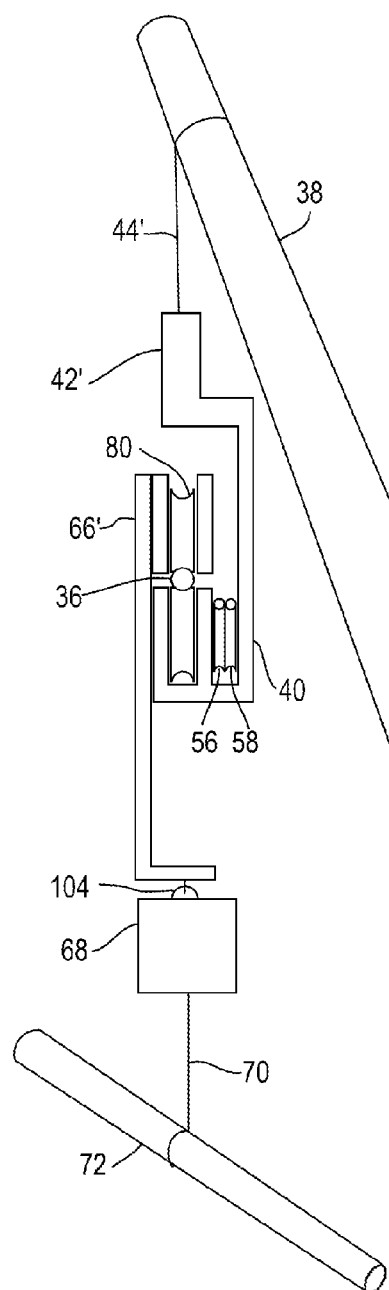
FIG. 3 is an end view of a slightly different variation of the device shown in FIG. 2.

In this variation, a jack 40 is suspended by the intermediate spar 38 and the skyline 36 traverses the jack 40. In one example, the jack 40 is suspended from a hanger or attachment point 42 which is bolted or otherwise attached to the intermediate spar 38. In the example of FIG. 2, the jack 40 is generally U-shaped and has an attachment point 42 at the upper end. A cable 44 or other apparatus extends between the attachment point 42 and a bracket 46 which is bolted, screwed, or otherwise attached to the intermediate spar 38. In the embodiment shown in FIG. 3, the jack 40' has an attachment point 42' with a cable or other attachment device 44' extending between the attachment point 42' and the intermediate spar 38. In the example shown in FIG. 3, the attachment device 44' is wrapped around, tied or otherwise wrapped about the spar tree and thus connected thereto.

Looking back to FIG. 2 it can be seen how the skyline 36 is supported by the jack 40 at one or more sheaves 48. Each of the sheaves 48 in one variation is attached by way of an axle 50 to side plates 52 and 54 of the jack 40 as can be better seen in FIG. 5. In one form adjacent the sheaves 48 are a plurality of sheaves 56 and 58 for the mainline 60 and haul-back line 62. These sheaves 56 and 58 are likewise attached by way of an axle to side plates 54 and 64 of the jack. In another form, a single sheave may be utilized for both the haul-back line and the mainline.

In one form, a remote yarder 68 is attached to and positioned below a carriage 66. In the example of FIG. 2, the carriage 66 comprises a plurality of side plates 106 with sheaves 80 positioned therebetween. The sheaves 80 support the carriage 66 as it traverses upon the skyline 36. The sheaves 80, as well as the other sheaves disclosed herein are generally wheels with a groove (generally a semi-circular groove in cross section) as can be seen in the end view of FIG. 5. An extension arm 88 in one form is pivotably attached to one of the side plates at a pivot 90 best seen in FIG. 6.

The remote yarder 68 generally comprises a winch, with a drop line 70 extending therefrom and attached to a load 72 for raising and lowering the load 72 relative to the ground surface 74. The remote yarder 68 may be fixed to the extension arm 88 as shown in the example of FIG. 2 with the drop line 70 adjustably extending therefrom. Alternatively, the remote yarder 68 may be fixed to the drop line 70 as shown in FIG. 4 where the winch portion is attached at an upper connection point 104 to the extension arm 88.

Looking still to FIG. 4 it can be seen how a remote operator 76 may be relatively proximate to the load 72 as the load 72 traverses along the skyline 36. In one form, the remote operator 76 manipulates a remote control device 78 connected to the remote yarder 68 by way of wires, sound waves, radio frequency, light pulses or other communication methods so as to control the remote yarder 68. For example, when approaching a tall obstruction, the remote operator 76 may desire to reduce the length of the drop line 70, lifting the load 72 well above the ground surface 74 so as to clear the obstruction. Similarly, as the load 72 approaches the desired destination, the remote operator 76 may lengthen the drop line 70 so as to position the load 72 adjacent to or on top of the desired final destination. As the load passes the intermediate spar, there may be a change in attitude of the skyline from an upward angle to a downward angle. This may require particular attention from one or both of the operators so tension the haulback line to ensure that the load does not accelerate down the skyline out of control. This attention and haulback line braking may be required at each and every intermediate spar. The remote operator 76 may also be in communication with a local operator 92 using similar communications methods. The local operator generally controlling or overseeing the function of the main yarder 24.

In another embodiment, the remote yarder 68, carriage 66, intermediate spar 38 or other component may be fitted with video cameras or other sensors. The remote operator 76 or local operator 92 might utilize a display device 102 such as a television, computer screen, or phone display for example to monitor the load 72 during transport.

While the load 72 is shown as a log, other loads could also be carried including water for fire control, food, fuel or any other cargo required at an outlying position or to be brought from an outlying position toward the yarder.

Returning to FIG. 4, it can be seen how the main yarder 24 comprises at least one drum 34 for the skyline 36. In at least one variation the main yarder also comprises separate drums 82 and 84 for the mainline 60 and haul-back line 62 respectively.

The mainline 60 traversing from the drum 82 past the extension arm 88 to an attachment point on the outbound end 86 (relative to the main yarder 24) of the carriage 66. As the mainline 60 is tensioned, the carriage 66 and associated load 72 will tend to be drawn toward the main yarder 24. Assuming that an intermediate spar 38 is between the load 72 and the main yarder, by attaching the mainline 60 to the outbound end 86 of the carriage 66, as the carriage 66 approaches the jack 40 there is no downward pressure on the near end 96 of the carriage from the mainline 60. Rather, the carriage is allowed to lift onto the jack 40 more easily than in prior art applications. Once the near end 96 of the carriage moves vertically above the jack 40 the relative angle of the mainline to the carriage 66 helps to pull the carriage 66 over the jack 40. This assistance is due in part to the relative angle of the anchor point 94 where the mainline 60 attaches to the carriage 66 as the carriage approaches the jack 40. FIG. 6 shows the main line 60 passing the arm 88 of the carriage 66 to attach at an anchor point 94 at the outbound end 86 of the carriage 66.

Similarly, but substantially in reverse, the haul-back line 62 in one example passes from the drum 84, over the sheave 100 at the intermediate spar 38 to the sheave 98 and back past the outbound end 86 of the carriage 66 to the attachment point at the near end 96 of the carriage. Thus, as the carriage 66 is being pulled outbound by the haulback line towards the strongpoint 28 the carriage 66 will likewise be lifted past the jack 40. As the haul-back line 62 is attached at the opposing near end 96 of the carriage 66, the haul-back line will not pull down on the outbound end 86 of the carriage 66 as the carriage 66 traverses an intermediate spar in the outbound direction.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A skyline transfer apparatus comprising:
   a main yarder;
   a tensioned skyline;
   a mainline;
   a haul-back line;
   a carriage comprising:
      at least one carriage side-plate comprising an inbound end closest to the main yarder and an outbound end furthest from the main yarder;
      a first skyline riding sheave rotatably attached at the inbound end of the carriage side plate(s);
      a second skyline riding sheave rotatably attached at the outbound end of the carriage side-plate(s);
      wherein the skyline riding sheaves ride upon the tensioned skyline during operation of the carriage;
   wherein a first end of the skyline is connected to the main yarder providing tensioning force to the skyline;
   wherein a second end of the skyline is fixed to an anchor point;
   a mainline attachment point at the outbound end of the carriage side-plate(s);
   wherein a first end of the mainline is connected to the main yarder providing tensioning force to the mainline, the mainline configured to move the carriage along the skyline toward the main yarder;
   wherein the mainline passes the inbound end of the carriage side-plate(s) and is connected to the mainline attachment point;
   a haul-back line attachment point at the inbound end of the carriage side-plate(s);

wherein a first end of the haul-back line is connected to the main yarder providing tensioning force to the haul-back line, the haul-back line configured to move the carriage along the skyline away from the main yarder;

wherein the haul-back line passes the outbound end of the carriage side-plate(s) and is connected to the haul-back line attachment point; and an independent drop line to support a load extending below the carriage;

a jack pivotably attached to an intermediate spar;
   wherein the intermediate spar supports the jack above a ground surface;
   wherein the jack comprises at least one side-plate(s) with at least one skyline supporting sheave rotatably attached to the at least one side-plate(s); and
   a haulback sheave and a mainline sheave rotatably mounted to the jack to directly and continuously support the haulback line and the mainline.

2. The skyline transfer apparatus as recited in claim 1 further comprising an extension arm attached to the carriage side plate (s) and having the drop line attached thereto.

3. The skyline transfer apparatus as recited in claim 1 wherein:
   the jack comprises a plurality of jack side-plates;
   the jack side-plates are pivotably coupled to a hanger attached to the intermediate spar; and
   the first and the second skyline supporting sheaves are rotatably attached at opposing ends of the jack side-plates with the hanger attached to the side plates therebetween.

4. The skyline transfer apparatus as recited in claim 1 wherein:
   the yarder is a three-drum yarder;
      a first drum is coupled to and provides tensioning force to the skyline;
      a second drum is coupled to and provides tensioning force to the mainline; and
      a third drum is coupled to and provides tensioning force to the haul-back line.

5. The skyline transfer apparatus as recited in claim 1 wherein the drop line has a drop length from the carriage to the load, and wherein the drop length can be remotely adjusted by an operator.

6. The skyline transfer apparatus as recited in claim 5 wherein:
   the carriage comprises a remote yarder having a winch;
   wherein the drop line extends from the winch such that the drop length can be remotely adjusted by an operator via the winch.

7. The skyline transfer apparatus as recited in claim 5 wherein:
   the remote yarder is remotely operated via a remote control;
   wherein the remote control operates the remote yarder via a communications connection selected from the list consisting of: wires, sound waves, radio frequency, and light pulses.

* * * * *